US012321143B1

(12) United States Patent
Capecelatro et al.

(10) Patent No.: US 12,321,143 B1
(45) Date of Patent: Jun. 3, 2025

(54) PREMISES AUTOMATION USER RECOMMENDATIONS

(71) Applicant: Josh.ai Inc., Denver, CO (US)

(72) Inventors: Alex Nathan Capecelatro, Los Angeles, CA (US); Timothy Earl Gill, Denver, CO (US); Kevin Carper, Denver, CO (US); Edward John McKenna, Jr., Denver, CO (US); Derek Murphy, Highlands Ranch, CO (US); Atticus Gifford, Glendale, CA (US)

(73) Assignee: Josh.ai, Inc., Denver, CO (US)

( * ) Notice: Subject to any disclaimer, the term of this patent is extended or adjusted under 35 U.S.C. 154(b) by 29 days.

(21) Appl. No.: 17/021,982

(22) Filed: Sep. 15, 2020

Related U.S. Application Data

(60) Provisional application No. 62/902,904, filed on Sep. 19, 2019.

(51) Int. Cl.
| | |
|---|---|
| *G05B 19/042* | (2006.01) |
| *G06F 3/16* | (2006.01) |
| *G06Q 50/163* | (2024.01) |
| *G06N 20/00* | (2019.01) |
| *G06Q 30/0601* | (2023.01) |
| *G06Q 50/06* | (2012.01) |

(52) U.S. Cl.
CPC .......... *G05B 19/042* (2013.01); *G06F 3/167* (2013.01); *G06Q 50/163* (2013.01); *G05B 2219/2614* (2013.01); *G05B 2219/2642* (2013.01); *G06N 20/00* (2019.01); *G06Q 30/0631* (2013.01); *G06Q 50/06* (2013.01)

(58) Field of Classification Search
CPC .......... G05B 19/042; G05B 2219/2614; G05B 2219/2642; G06F 3/167; G06Q 50/163; G06Q 30/0631; G06Q 50/06; G06N 20/00
See application file for complete search history.

(56) References Cited

U.S. PATENT DOCUMENTS

| | | | |
|---|---|---|---|
| 9,014,658 B2 * | 4/2015 | Johnson | H04W 12/069 |
| | | | 455/404.1 |
| 10,529,101 B1 * | 1/2020 | Kerzner | G06V 20/52 |
| 2012/0150651 A1 * | 6/2012 | Hoffberg | H04N 21/466 |
| | | | 705/14.58 |
| 2013/0297555 A1 * | 11/2013 | Fadell | H04L 12/282 |
| | | | 706/52 |
| 2014/0316582 A1 * | 10/2014 | Berg-Sonne | G06Q 50/06 |
| | | | 700/276 |
| 2015/0260581 A1 * | 9/2015 | Fadell | G08B 17/00 |
| | | | 307/117 |
| 2016/0104076 A1 * | 4/2016 | Maheshwari | G06N 20/00 |
| | | | 706/12 |
| 2016/0259308 A1 * | 9/2016 | Fadell | H04W 4/80 |
| 2016/0359825 A1 * | 12/2016 | Chand | G06F 21/64 |
| 2017/0033942 A1 * | 2/2017 | Koeninger | H04L 12/2829 |

(Continued)

*Primary Examiner* — Darrin D Dunn
*Assistant Examiner* — Marzia T Monty
(74) *Attorney, Agent, or Firm* — Van Pelt, Yi & James LLP

(57) ABSTRACT

For each of a plurality of subsystems comprising a premises automation solution a corresponding current controlled state information is stored. Stored state information associated with the plurality of subsystems is used to generate and provide as output a recommendation to perform a recommended operation with respect to one or more of said subsystems.

32 Claims, 7 Drawing Sheets

(56) References Cited

U.S. PATENT DOCUMENTS

| | | | |
|---|---|---|---|
| 2019/0150651 A1* | 5/2019 | Pham | H02P 1/16 |
| 2019/0318283 A1* | 10/2019 | Kelly | G06N 20/00 |
| 2019/0349213 A1* | 11/2019 | Shive | G06N 5/022 |
| 2020/0217536 A1* | 7/2020 | Guan | F24F 11/58 |
| 2020/0285206 A1* | 9/2020 | Young | G08B 19/00 |
| 2020/0301499 A1* | 9/2020 | Marti | H04L 67/125 |
| 2021/0057113 A1* | 2/2021 | Ni | G16Y 40/35 |

* cited by examiner

PREMISES AUTOMATION USER RECOMMENDATIONS

CROSS REFERENCE TO OTHER APPLICATIONS

This application claims priority to U.S. Provisional Patent Application No. 62/902,904 entitled HOME AUTOMATION RECOMMENDATIONS filed Sep. 19, 2019 which is incorporated herein by reference for all purposes.

BACKGROUND OF THE INVENTION

One use for technology is to establish a system of control. In premises automation, for example home automation, a system controls various aspects of the premises such as lighting, music, and heating, ventilation and air conditioning (HVAC) based in part on user input. To control each aspect of the premises automation system may be overwhelming or time consuming. It would be useful to have easier ways to maintain a system of control.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Storing a current controlled state information for premises automation solution subsystems and using stored state information to generate recommendations is disclosed. Recommendation generation may be based at least in part on: a user's preferences from past behavior/settings; a user's response to a similar premises state including time of day, location, weather, and current events; a similar user's reaction to a similar premises state; a user's and/or a similar user's response to another recommendation; or an anomaly based on one or more user's behavior/settings, such as a back door opening when the premises users are all away.

Figure 1:
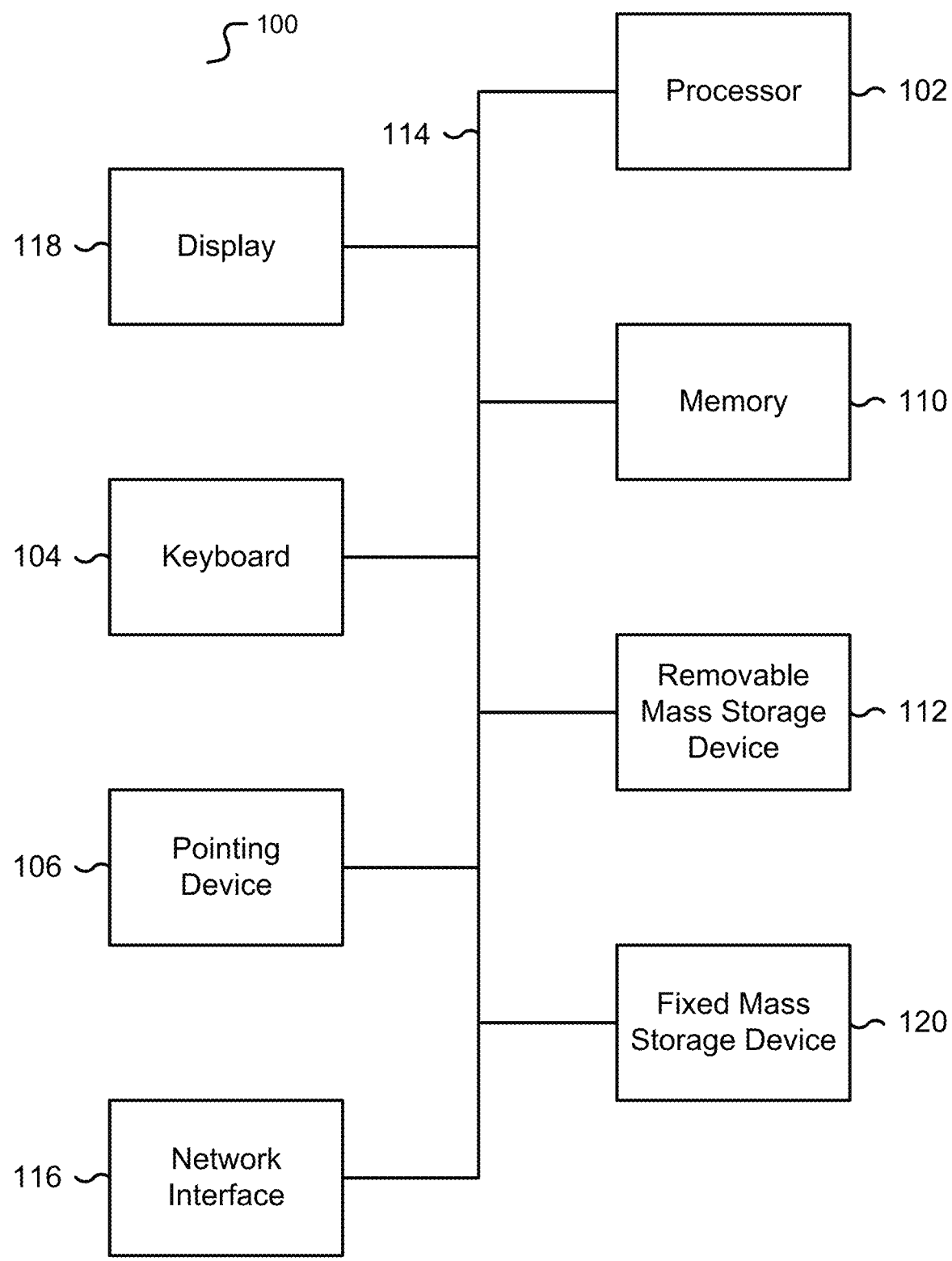
FIG. 1 is a functional diagram illustrating a programmed computer/server system for control of complex input in accordance with some embodiments.

FIG. 1 is a functional diagram illustrating a programmed computer/server system for control of complex input in accordance with some embodiments. As shown, FIG. 1 provides a functional diagram of a general purpose computer system programmed to provide premises automation recommendations in accordance with some embodiments. As will be apparent, other computer system architectures and configurations can be used for premises automation recommendations.

Computer system 100, which includes various subsystems as described below, includes at least one microprocessor subsystem, also referred to as a processor or a central processing unit ("CPU") 102. For example, processor 102 can be implemented by a single-chip processor or by multiple cores and/or processors. In some embodiments, processor 102 is a general purpose digital processor that controls the operation of the computer system 100. Using instructions retrieved from memory 110, the processor 102 controls the reception and manipulation of input data, and the output and display of data on output devices, for example display and graphics processing unit (GPU) 118.

Processor 102 is coupled bi-directionally with memory 110, which can include a first primary storage, typically a random-access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data and objects used by the processor 102 to perform its functions, for example programmed instructions. For example, primary storage devices 110 can include any suitable computer-readable storage media, described below, depending on whether, for example, data access needs to be bi-directional or uni-directional. For example, processor 102 can also directly and very rapidly retrieve and store frequently needed data in a cache memory, not shown. The processor 102 may also include a coprocessor (not shown) as a supplemental processing component to aid the processor and/or memory 110.

A removable mass storage device 112 provides additional data storage capacity for the computer system 100, and is coupled either bi-directionally (read/write) or uni-directionally (read only) to processor 102. For example, storage 112 can also include computer-readable media such as flash memory, portable mass storage devices, holographic storage devices, magnetic devices, magneto-optical devices, optical devices, and other storage devices. A fixed mass storage 120 can also, for example, provide additional data storage capacity. One example of mass storage 120 is an eMMC or microSD device. In one embodiment, mass storage 120 is a solid-state drive connected by a bus 114. Mass storage 112, 120 generally store additional programming instructions, data, and the like that typically are not in active use by the processor 102. It will be appreciated that the information retained within mass storage 112, 120 can be incorporated, if needed, in standard fashion as part of primary storage 110, for example RAM, as virtual memory.

In addition to providing processor 102 access to storage subsystems, bus 114 can be used to provide access to other subsystems and devices as well. As shown, these can include a display monitor 118, a communication interface 116, a touch (or physical) keyboard 104, and one or more auxiliary input/output devices 106 including an audio interface, a sound card, microphone, audio port, audio input device, audio card, speakers, a touch (or pointing) device, and/or other subsystems as needed. Besides a touch screen, the auxiliary device 106 can be a mouse, stylus, track ball, or tablet, and is useful for interacting with a graphical user interface.

The communication interface 116 allows processor 102 to be coupled to another computer, computer network, or telecommunications network using a network connection as shown. For example, through the communication interface 116, the processor 102 can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Throughout this specification "network" refers to any interconnection between computer components including the Internet, Bluetooth, WiFi, 3G, 4G, 4GLTE, GSM, Ethernet, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, can also be connected to processor 102 through communication interface 116.

An auxiliary I/O device interface, not shown, can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: flash media such as NAND flash, eMMC, SD, compact flash; magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that can be executed using an interpreter.

The computer/server system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2:
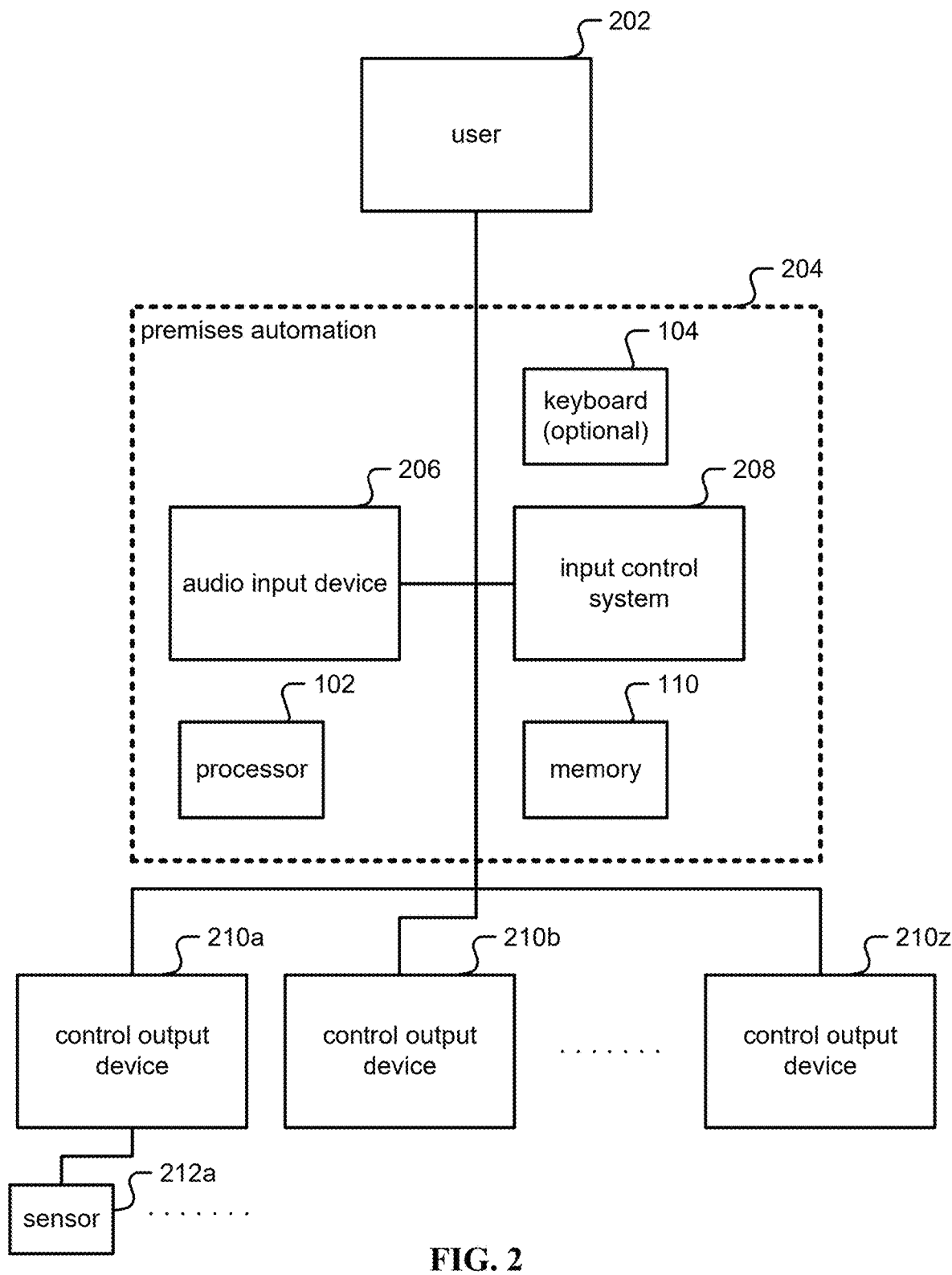
FIG. 2 is a block diagram illustrating an embodiment of a system for premises automation recommendations.

FIG. 2 is a block diagram illustrating an embodiment of a system for premises automation recommendations. User (202) is coupled to premises automation system (204), either through an audio input device (206) if by way of speech, or directly to the input control system (208) if by way of written word, for example by typing or texting. In one embodiment, premises automation system (204) is a computer system as shown in FIG. 1 and includes processor (102) and memory (110). In one embodiment, the premises automation system (204) is a mobile phone, computer, or dedicated smart home device. In one embodiment, a physical, phone, touchscreen, swipe-based keyboard and/or virtual keyboard (104) is included for typing or texting. In one embodiment, no keyboard (104) is used. The audio input device (206) may be coupled and/or part of the input control system (208) as well. After interpreting programming, the input control system (208) may be coupled to one or more control output devices (210), here shown with three devices (210*a*), (210*b*), and (210*z*). The control output devices (210) may be a single smart home hub (210*a*) and/or may include additional smart home devices for direct control. One or more sensors (212*a*) may be part of any control output device (210).

Figure 3A:
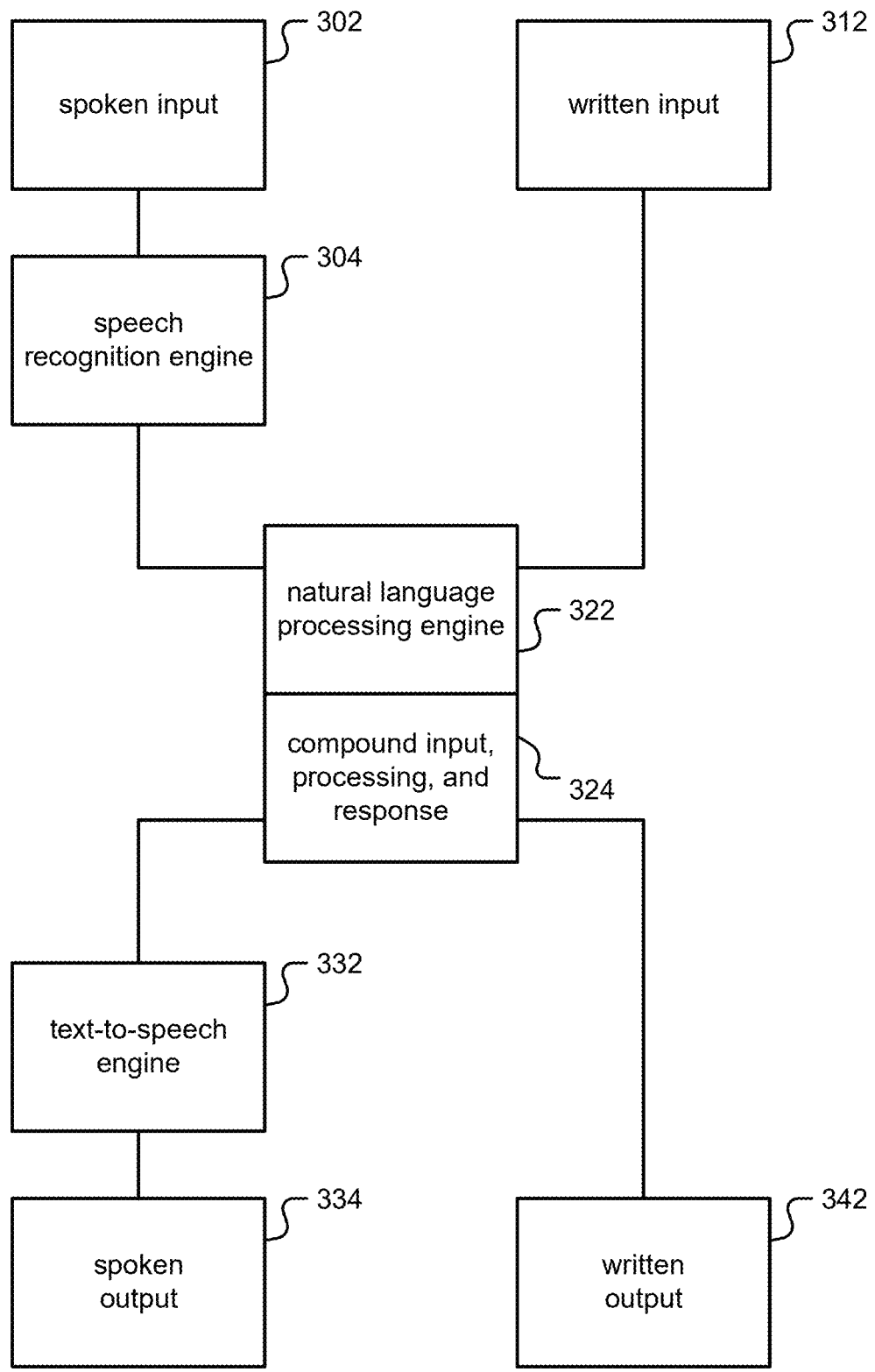
FIG. 3A is a block diagram illustrating an embodiment of a system for complex input speech and written processing.

FIG. 3A is a block diagram illustrating an embodiment of a system for complex input speech and written processing. In one embodiment, the system of FIG. 3 is at least part of the premises automation system (204) and/or control output device (210*a*) in FIG. 2.

As FIG. 3A illustrates, input may be spoken and/or written, and output may be spoken and/or written. Spoken input (302) is processed by a speech recognition engine (304) before being passed to the natural language processing engine (322). Written input (312) may be processed directly by the natural language processing engine (322). In one embodiment, written input (312) may correct, add, edit, delete, the resultant input from spoken input (302) and speech recognition engine (304).

Note that in some cases, the spoken input (302) and/or written input (312) may have little or no punctuation, capitalization, and/or proper nouns recognized. Natural language processing engine (322) applies rules and couples the system for complex/compound input, processing, and response (324). User notification of responses includes written output (342) from system (324), and may include a text-to-speech engine (332) to provide spoken output (334) as well.

Figure 3B:
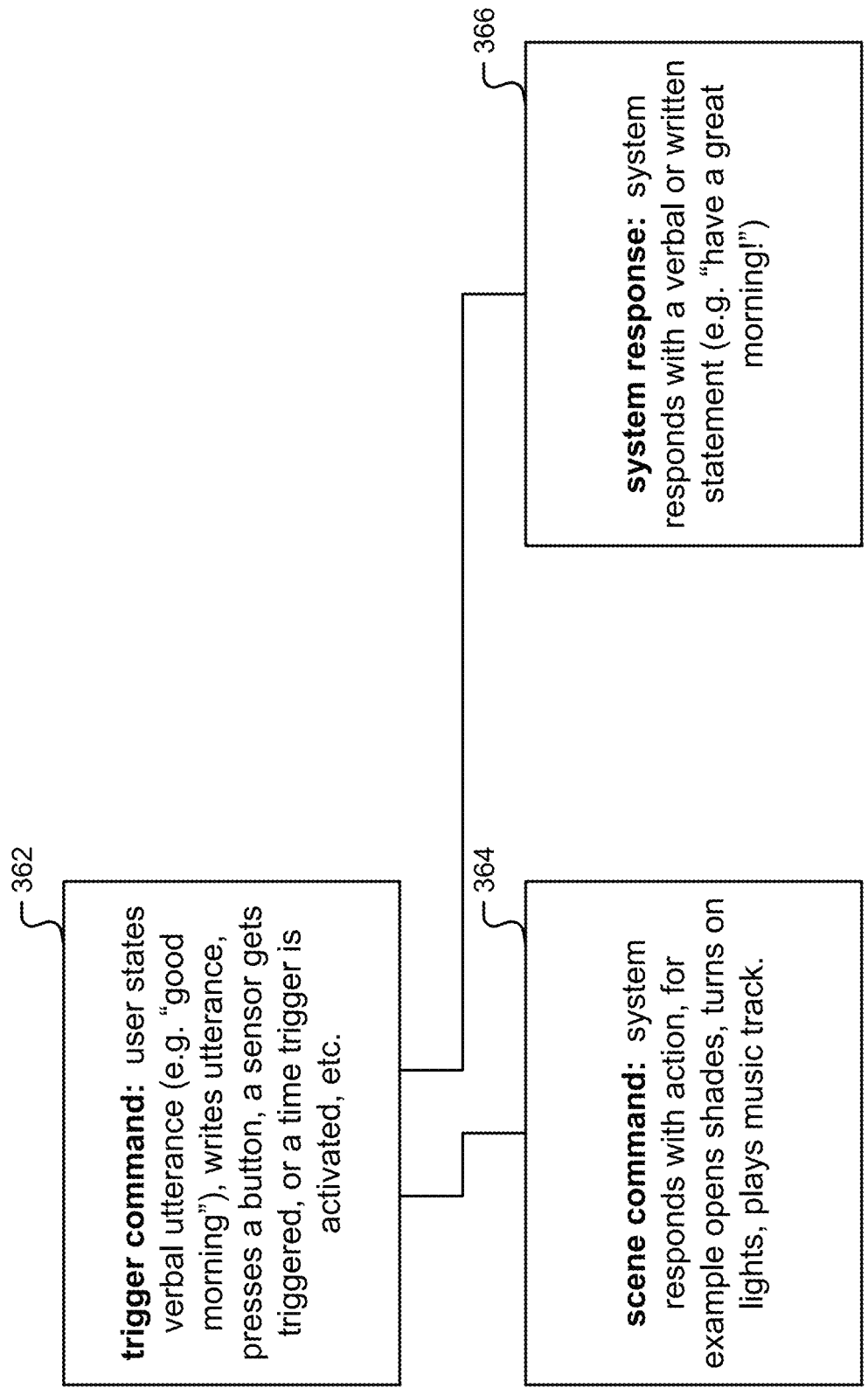
FIG. 3B is an illustration of a trigger and corresponding scene command.

FIG. 3B is an illustration of a trigger and corresponding scene command. In one embodiment, the illustration of FIG. 3B is carried out by the system (204) of FIG. 2.

Trigger command (362) is an action that triggers a scene. In the example of FIG. 3B, the action includes: a voice command, for example a user that says "Good morning"; a button press, for example a user that presses a button titled "Morning"; a triggered sensor; and/or a triggered time, for example based on a schedule.

After the system is triggered (362), the system may optionally respond with a "scene" command (364). Examples given in FIG. 3B include opening the shades, turning on the lights, and playing a musical track. A scene command, also referred to herein as a "premises automation scene", is a convenient way to refer to one or more aspects of premises automation. For example, a "good morning" command may include opening the shades, turning on the lights, and playing a musical track suitable for mornings because the user prefers to start their morning with these aspects of premises automation. After the system is triggered (362) a system response (366) may optionally be issued by responding with a written or verbal output, for example "Have a great morning!"

FIGS. 4A-4E are screenshot illustrations illustrating an embodiment of an application flow for premises automation recommendation. In one embodiment, the screenshots of FIGS. 4A-4E may occur on the display of premises automation device (204) in FIG. 2.

Figure 4C:
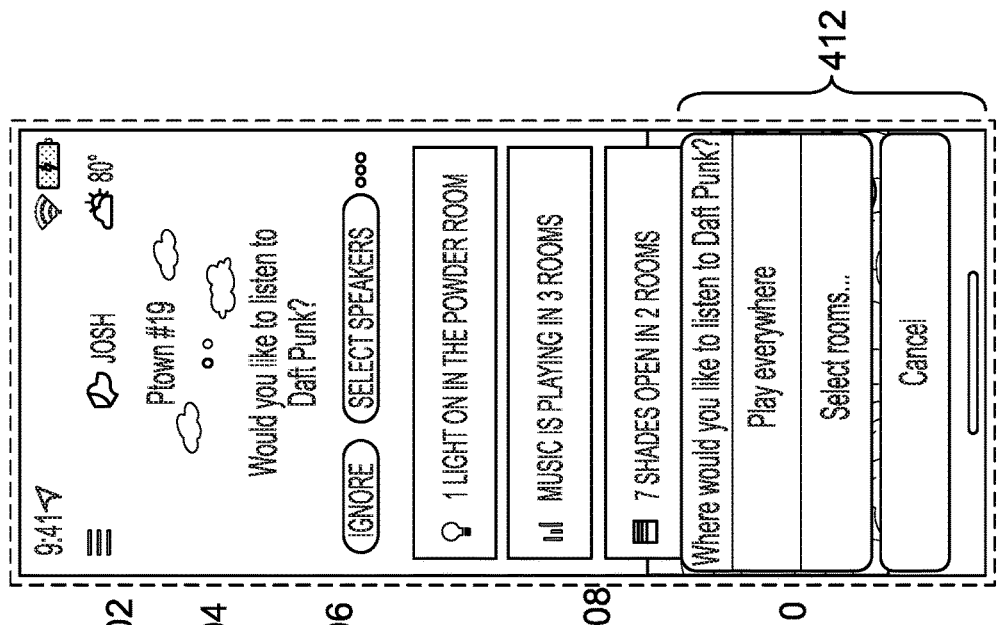
FIG. 4C is an example screenshot of a follow-up recommendation response.
Figure 4B:
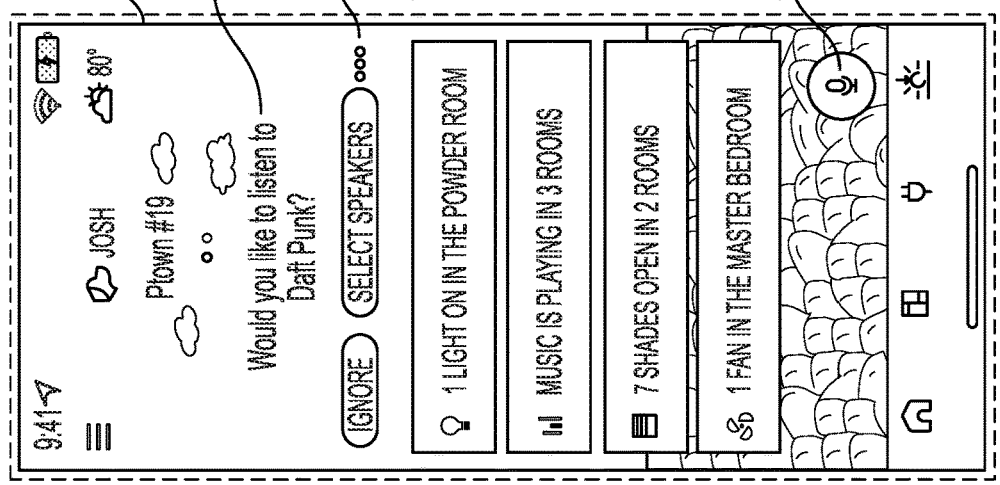
FIG. 4B is an example screenshot of a home page of the app of FIG. 4A, in its second view, a recommendations dashboard (402).
Figure 4A:
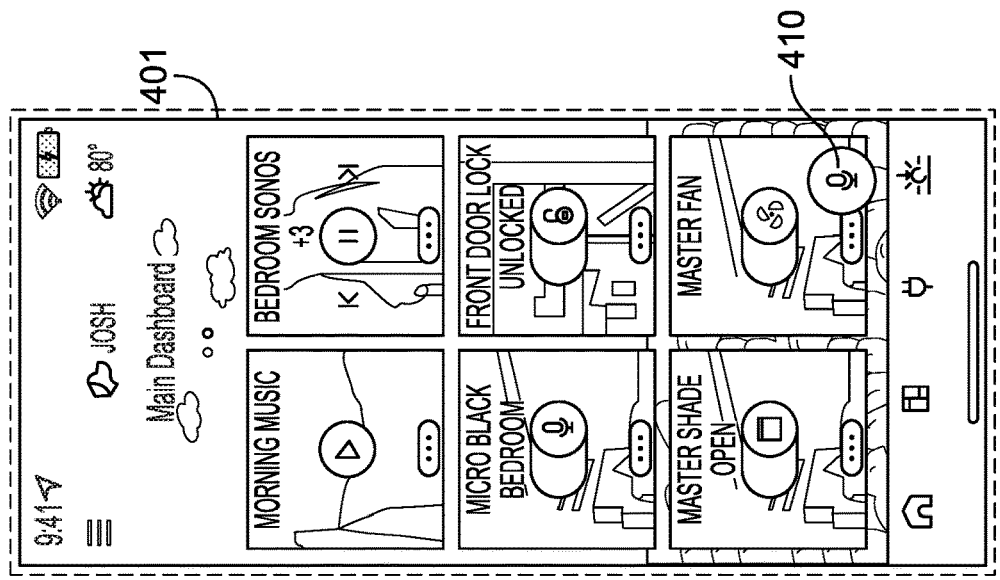
FIG. 4A is an example screenshot of a home page of an app, such as an Android app or iOS app which may default to one of at least two views.

FIG. 4A is an example screenshot of a home page of an app, such as an Android app or iOS app which may default to one of at least two views. One view is the "Main Dashboard" view (401) which shows a traditional premises automation control scheme for home "Ptown #19". In the particular example of FIG. 4A, the premises automation device (204) may control using the main dashboard (401) the playback of morning music, may control ongoing playback of music in three bedrooms, may control lights currently lit in the micro black bedroom, may lock the currently unlocked front door, may close the currently open shade open in the master bedroom, and may turn off the currently on fan in the master bedroom. Besides using the virtual switches shown on the dashboard (401), voice control may be used by asserting voice toggle user interface (UI) element (410).

FIG. 4B is an example screenshot of a home page of the app of FIG. 4A, in its second view, a recommendations dashboard (402). A user may "swipe" the touchscreen on premises automation device (204), for example to swipe left from main dashboard (401) of FIG. 4A, to get to recommendations dashboard (402).

The recommendations dashboard includes a recommendation statement (404), in this particular case "Would you like to listen to Daft Punk?", as well as UI elements for a recommendations response (406), which in this particular case include an option to ignore the recommendation or select speakers. Like the main dashboard (401) of FIG. 4A, direct control without recommendations of the same devices in FIG. 4A is still allowed in a simplified direct control view (408), and/or voice control UI element (410) may be asserted.

The system (204) may recommend listening to the music artist "Daft Punk" based on a stored state information. For example, the system (204) may suggest prioritizing a recommendation to listen to Daft Punk based at least in part on:

The history of when the user of device (204) listened to Daft Punk, or similar music, for example based on the day of the week and/or the time of day;

The location of the user of device (204), for example if the user enjoys listening to Daft Punk when they first get home from work;

The weather outside, for example if the system (204) infers that rainy and stormy days are days when Daft Punk is typically played; and/or The recent history of direct control, for example if the system (204) infers that when the shades are all open then Daft Punk is typically played.

FIG. 4C is an example screenshot of a follow-up recommendation response. In the example shown in FIG. 4C, this is a recommendation response dialog element to the recommendations statement (404) in FIG. 4B, after the user selects "Select Speakers" (406). The follow-up response (412) includes options to either "play everywhere", select particular rooms, or cancel the recommendation response.

Figure 4D:
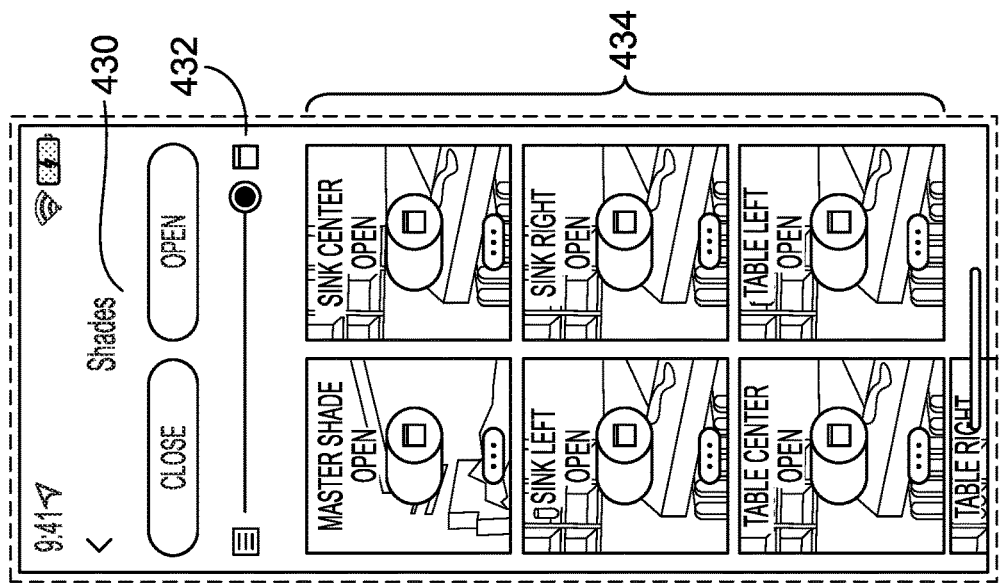
FIG. 4D is a second example screenshot of a recommendations dashboard (403).

FIG. 4D is a second example screenshot of a recommendations dashboard (403). The second screenshot of FIG. 4D may occur after a user resolves a first recommendation (404) in FIG. 4B, either to listen to the recommended music or to ignore the recommendation. Alternately, FIG. 4D may be the first recommendation a user sees if the system (204) has ranked this is a more important recommendation over the music recommendation of FIG. 4B.

The recommendations dashboard includes a recommendation statement (414), in this particular case "There are seven shades open. Should I close them?", as well as UI elements for a recommendations response (416), which in this particular case include an option to ignore the recommendation, close all, and other options not immediately shown under the ellipsis UI element. Like the main dashboard (401) of FIG. 4A, direct control without recommendations of the same devices in FIG. 4A is still allowed in a simplified direct control view (418), and/or voice control UI element (410) may be asserted.

The system (204) may recommend closing all the shades based on a stored state information. For example, the system (204) may suggest prioritizing a recommendation to close all shades at least in part on:

The history of when the user of device (204) closes all shades, for example based on the day of the week and/or the time of day;

The location of the user of device (204), for example if the system (204) infers that no one is home and to close all shades for privacy;

The weather outside, for example if the system (204) infers that sunny and hot times of day are days when shades may be all closed to conserve energy; and/or.

The recent history of direct control, for example if the system (204) infers that when two shades have been closed then the user typically is trying to close all the shades.

Figure 4E:
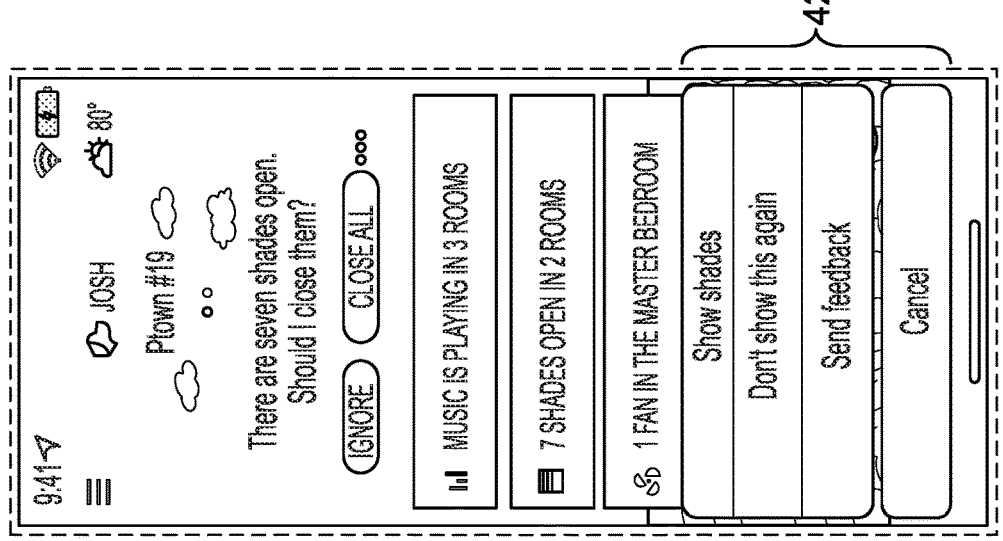
FIG. 4E is a second example screenshot of a detailed recommendation response.

FIG. 4E is a second example screenshot of a detailed recommendation response. In the example shown in FIG. 4E, this is a detailed recommendation response dialog element to the recommendations statement (414) in FIG. 4D, after the user selects the ellipsis (" . . . ") UI element (416). The detailed response (422) includes options to show shades, to not show this recommendation and/or similar recommendations again, to give feedback on this particular recommendation or style of recommendation, and to cancel the detailed dialog.

Figure 4F:
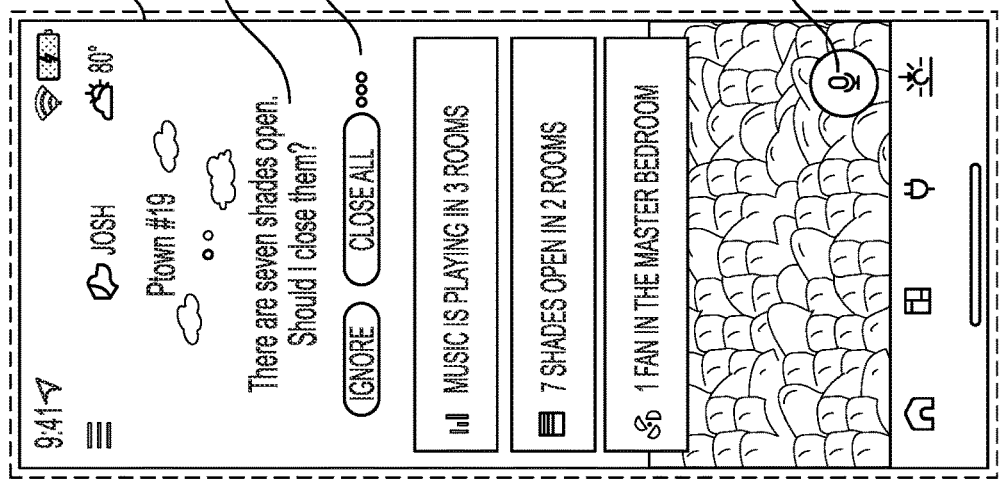
FIG. 4F is a second example screenshot of a follow-up recommendation response.

FIG. 4F is a second example screenshot of a follow-up recommendation response. In the example shown in FIG. 4F, this is a recommendation response dialog element to the detailed dialog (422) in FIG. 4E, after the user selects "Show shades". The follow-up response includes options to close or open all shades (430), open shades to a specified extent using a slider UI element (432), or individually control each shade (434).

In one embodiment, recommendations are given based on a local determination from processor (102) in premises automation device (204) as shown in FIG. 2 in order to preserve privacy of the user (202). In one embodiment, a network is between premises automation device (204) and control output devices (210), for example, a mobile phone (204) is connected via 4G/5G/WiFi to a cloud-based server and a control output device (210a) is also connected via an Internet service provider to the same cloud-based server, but privacy preservation elements include, without limitation, a secure/encrypted communication channel between premises automation device (204) and control device (210a) without any storage of state on the cloud server.

In one embodiment, with suitable privacy protection, a remote determination by a premises automation device (204) may be given across a network using network interface (116) in FIG. 1, wherein the network is a local area network, Internet, or cloud-based. In one embodiment, storage of aggregated, anonymized and/or otherwise privacy protected recommendations of the user (202) and other users is provided in a network server/cloud network to improve recommendations by providing peer history and/or state. In one embodiment, other cloud-based services for example a weather prediction service, is used to improve recommendations by providing environmental/external history and/or state.

In one embodiment, geographic granularity is based on a household basis, for example a recommendation may be different whether a user is either at home or not at home. In one embodiment, geographic granularity is based on a room basis, for a user is in the living room, kitchen, bathroom, and so on, and recommendations may change based on which room a user (202) is in and/or other inhabitants/users are in.

In one embodiment, recommendations are designed at least in part to have a binary outcome-either to accept the recommendation or to ignore the recommendation, to improve collaborative filtering. Collaborative filtering as referred to herein is an adaptive filter determining which recommendations or similar recommendations are often followed, and which recommendations or similar recommendations are often ignored, to improve future recommendation offerings. For example, if a user (202) often ignores recommendations related to shades, the system may reduce or eliminate shade recommendations; alternately if a user (202) often accepts lighting recommendations, the system may increase the absolute/relative number of recommendations for lighting.

In one embodiment, recommendations are advertisement, product recommendation, and/or product placement. In the event a sensor (212a) indicates a subsystem is failing, a recommendation may indicate a suitable replacement or improved subsystem. For example, if a thermostat is determined to be incompatible or not advanced enough, a recommendation may be to upgrade the thermostat to a new smarter thermostat. For example, if a thermostat is determined to be failing, a recommendation may be to purchase a new thermostat from the same manufacturer and/or a competitor.

In one embodiment, recommendations are not and/or not only presented in a user interface/display of a premises automation device (204), and may be presented as verbal recommendations. For example, if a user asks "Is there anything I should know?" or "Do you have any tips?" the system may respond with a verbal recommendation such as "Seven shades are open. Should I close them?" Answers to other requests may also have recommendations added to them. For example, if a user asks "What is the time?", the system may respond "The time is 7:15 am; and by the way, there's a big snow storm coming our way this morning, do you want to increase the room temperature?"

In one embodiment, recommendations are related to scenes/scene commands. A recommendation may be to activate a scene, or activate a scene at a different time than typically scheduled and/or expected. For example, if a "good morning" scene is normally scheduled for 8 am, and the system detects the user waked up earlier at 7 am, one recommendation may be "It looks like you are awake early! Would you like to start your Good Morning earlier?" For example, if a user (202) returns to their house early on a Friday, one recommendation may be "It looks like you came home early, would you like to kick back with your Weekend?"

In one embodiment, recommendations are scenes to be created. If the system determines a user behavior pattern that has not yet had a scene created, then a recommendation is to create a scene command for the user, reducing time the user needs to take to set up the premises. For example, if a user often wakes up and turns on the bedroom lights, opens the bedroom shades, and play classical music, the recommendation may be "Would you like us to create a Good Morning scene based on your usual routine?"

In one embodiment, to form recommendations the premises automation (204) records what the user does locally, storing it with a timestamp/datestamp and/or a location stamp, bucketing/binning actions according to time/date and/or geolocation, and forming a collection of queries on previous times, optionally paired with locations.

For example, recommendations are different at 5 am, noon, and 5 pm. If the time is 5 pm on Wednesday, a recommendation is based on at least one of the following: what the user requested at 5 pm on Tuesday, what the user requested reasonably consistently at 5 μm from last Thursday through Tuesday, what the user requested between 4 μm and 6 pm on Tuesday, what the user requested reasonably consistently between 4 μm and 6 μm from last Thursday through Tuesday, what the user requested between 3 μm and 7 pm on Tuesday, and so forth.

In one embodiment, a geolocation element is used to refine recommendations based on whether the user action was in a location identical and/or close to the historical actions. For example, if the time is 5 pm on Wednesday and the user is in the living room, a recommendation is based on at least one of the following: what the user requested at 5 pm on Tuesday in the living room, what the user requested reasonably consistently at 5 μm from last Thursday through Tuesday in the living room, what the user requested at 5 pm on Tuesday in other rooms in the home, what the user requested between 4 μm and 6 pm on Tuesday in the living room, what the user requested between 4 μm and 6 pm on Tuesday in other rooms in the home, and so forth.

Overview of Recommendations.

A premises automation solution that generates alerts, notifications, and/or recommendations based on the current and previous states of various devices, appliances, and/or environment in/around the home is disclosed. The system may make recommendations to allow homeowners and/or guests in the home to alter the state of these devices.

These alerts, notifications, and/or recommendations may be displayed in various ways, including without limitation: a mobile device app, a web based interface, spoken from a device with a microphone and speaker, and/or any other appropriate mechanism. Other possible notification mechanisms are to flash the lights a particular color, turn on a TV and display content, and/or emit a tone.

In one embodiment, alerts, notifications, and/or recommendations are occasionally converted to conversational text either displayed or spoken. An example of one such alert would be the home stating, "Hi John, your front door is unlocked. Would you like me to lock it?" with a "Yes" or "No" response available. Alerts, notifications, and/or recommendations may be customizable based on what types of events the homeowner is interested in being alerted to, or inferred to be interested in being alerted to.

Privacy and Security. In one embodiment, the system alerts on, notifies about, and/or recommends based on the status of door locks, gate and garage doors, shades, windows, and alarm systems. Some examples are:

The system notifies when a user has forgotten to lock the door or close gate/garage doors;
The system notifies when a user has forgotten to close the shades or drapes;
The system notifies when a user leaves the home without the alarm system engaged;
The system notifies when windows and doors are left open; and/or
The system notifies when there is motion in the house.

In one embodiment, a "privacy mode" is provided to remove/not store user-related data and/or history. In privacy mode, static determinations may still be made for alerts/notifications/recommendations. One example of a static determination regardless of a user's preferences and/or history is a recommendation to close shades at night when strangers outside a home may be able to see into lighted rooms in the home, resulting in a recommendation "It's night and your living room shades are open while the living room lights are on; would you like to close the living room shades?"

Static determinations include anomaly determinations. One example of an anomaly regardless of a user's preferences and/or history is a notification when a garage door is open and no one is home, resulting in a recommendation "There's no one home but the garage door is opening. Do you want to trigger the security alarm?"

In one embodiment, alerts/notifications/recommendations have severity levels that can notify you with increasing persistence, such as starting with a notification email, increased to a push notification on a mobile device, increased to a text message, increased to a phone call, increased to a video call, increased to a call to a security authority. For example, if lights and shades are on at night may be at low severity, wherein if garage doors are opening while no one is home may be at a high severity.

Cameras and Intercoms. In one embodiment, the system notifies based on motion, noise detection, object recognition, license plate recognition or facial recognition. The system may ask questions of the homeowner when someone is outside. For example: "A person is at the front door, would you like to unlock it?" or "Your mother is at the front gate, would you like to open it?" For example, if user (202) often turns the front door light on for their wife for when she comes home and one day forgets, one recommendation when her car's license plate is recognized may be "Carol is pulling up to our home; would you like me to turn on the front door light?" In one embodiment, an alert/notification/recommendation includes creation of a scene trigger, wherein a scene trigger is a set of one or more conditions to trigger a scene, for example a set of conditions including "wife's car pulling up", "between the hours of dusk to dawn", triggers the scene "Husband Cooking".

Media. In one embodiment, the system recommends audio or video content that may be of interest to the user based on past behavior.

The system may recommend playing music by artists or genres that the user/residents have listened to before. Another example is a user who the system determines prefers to listen to music with a specific beats per minute range in the gym, but would prefer music recommendations with slower beats per minute in the office. Further music recommendations may change based on the time of day, weather outside, the temperature in the home, or who is in the home and what the status of various devices on the home are. In one embodiment, the system may recommend playing music that a user has not listened to before, but are similar to music that a user has listened to before more frequently.

The system may recommend videos, shows, and/or movies that the user/residents like based on the types of shows and movies that have been watched before. These recommendations may be based on where the user is watching television, for example content watched in a kids room would produce different recommendations for that space. The system may recommend cable/satellite channels and streaming content based on past viewing habits, such as frequently watched serials.

The system may recommend sports, political, and/or events that the user has watched before and/or otherwise provided preferences for. For example, a user may be a New York Yankees baseball fan, and a recommendation may be "Don't forget the Yankees exhibition game is starting, would you like to turn on the smart popcorn machine?" For example, a space craft may have a tragic accident, and a recommendation may be "Sorry to interrupt, but unfortunately the space shuttle Columbia broke apart, did you want to turn on the news?"

Energy Management. In one embodiment, the system monitors the energy usage in a location and gives alerts/notifications/recommendations when energy usage is inside or outside of a given threshold. The user may set their threshold preference in the system. The system also gives recommendations on which devices to turn on or off to return the energy usage to within the threshold.

For example, the system flags if a particular device is using too much energy, and gives a notification and/or a recommendations to turn that device off, for example "Your pool heater has been on for forty hours and the temperature is warm out; do you want to turn off your pool heater?" Another example is when the outside temperature is increasing, but the shades are all open, the system may notify the user that closing the shades keeps the house cool.

Energy management also includes demand pricing, for example often power is more expensive in the late afternoon than early morning. A recommendation may include arrangement to reduce energy demand, such as "You are doing a lot of laundry in the late afternoon; can I help you schedule laundry in the mornings instead?" Generally alerts/notifications/recommendations include a calendar integration. For example a recommendation may be "I see you have a flight tomorrow at 7 am; would you like me to schedule the Good Morning scene tomorrow at 4:30 am instead of 8 am?"

Weather. In one embodiment, the system recommends device actions based on weather conditions. If the weather conditions recommend that a device should be acted on or be in a different state, the system notifies this so that action can be taken. For example, the weather conditions change from sun to rain and the system notices there are windows or doors open, the system notifies to close the windows or doors. Or if the system detects snow possibilities, it may recommend turning on the snow melt and/or heated driveway, or to call a snowplow company to clear the driveway. Alternately, if the weather conditions go from rain to sun, the recommendation may be "It's the first sun in two weeks; enjoy it! May I schedule your pool heater in advance?"

News. In one embodiment, the system recommends news and current affairs notifications. The user may set news preferences for news they would like to see, or the system may recommend relevant news based on machine learned information about the user. The system may recommend incremental actions in reaction to increasing severity, for example in increasing severity, turning on the television to capture as-it-happens news, presenting a hyperlink to get more details, and/or sharing hyperlinks or alerts with colleagues/friends/family. For example, if a hurricane is coming to a user's childhood home, a recommendation may include "Springfield was mentioned in the hurricane broadcast; do you want to let your old high school classmates know about it?"

Sports and Entertainment. In one embodiment, the system recommends Sports and Entertainment notifications. The user may set sports or entertainment preferences for content they would like to see. For example, the system may tell a user a specific game is close between two teams and recommend turning on the game on in a specific location, if the user has indicated interest in that sport and/or one of the teams.

Scene Recommendations. In one embodiment, the system recommends scenes to run based on a past user's scene command history. Common scenes include "Good morning," "Good night," and "Entertain." The system may keep track of all conditions when the user has run scenes in the past, and relate that history to the current conditions. Conditions may include time, date, day of the week, weather, sunrise/sunset times, occupancy of home/rooms, and geo-location. If the current conditions relate to the conditions when a scene has previously been run, the system may recommend to run that scene again. For example, the user runs a "Good Night" scene each day at approximately 10:30 pm, the system recommends the user to run the "Good Night" scene prior to 10:30 pm, in the event the user is at home at that time.

The system may recommend scenes that a user should create. For example, as the system observes that when a user comes home they always close the garage, turn off the garage lights, open the living room shades, turn on the living room lights and listen to their favorite playlist. The system recommends that the user creates an "I'm Home Scene" that they could more easily run everyday by simply saying "I'm Home", reducing the time a user would need to set up the premises automation.

Reminders/Scheduled Actions. In one embodiment, the system recommends commands to run based on users' past command history. The system keeps track of all conditions when the user has given a command and/or the result of those commands, and relates that history to the current conditions. Conditions may include without limitation time, date, day of the week, weather, sunrise/sunset times, occupancy of home/rooms, and device state. If current conditions relate to conditions when a previous command has been given, the system recommends that particular command, or a similar command again.

For example, if the system identifies the user turning on the lights at or near sunset each day, the system may recommend "Would you like to turn on the lights before dusk?" just prior to sunset. Other reminders may include personal reminders, such as taking daily vitamins and/or pills, feeding the dog, and/or taking out the trash. In one embodiment, the system reminds a user if they have scheduled upcoming actions. For example, if a user asks the system to turn on the lights at 6 pm, it may remind them at 5 pm that the action is scheduled to take place in an hour.

Kitchen Appliances. In one embodiment, the system alerts the homeowner if appliances like ovens or stoves are being used at unusual times or have been on for too long. In these cases, the system recommends turning the oven off. If a refrigerator or freezer temperature is not within a preset threshold, the system generates a notification so that corrective action may be taken. Another example is if a smart refrigerator is low on orange juice the system may recommend purchasing more orange juice when a user is away from home.

General Utility and Safety. In one embodiment, the system alerts the homeowner if devices may be left in a dangerous state, like fireplaces being used at unusual times or have been on for too long. Another example would be water running at unusual times or for extended periods of time. In these cases, the system recommends, for example, turning the fireplace and/or water faucet off. Another example of general utility is enabling snow melt when the temperature drops below freezing and there is precipitation, and/or the system may recommend closing umbrellas when high winds are predicted.

In one embodiment, a system uses geolocation and premises management to make recommendations. For example, if it understands a user is currently driving towards a weekend cottage in winter, the recommendation may be "It looks like you're driving towards your second home in Tahoe; remember you should pick up some milk on your way in as the refrigerator is low. May I turn on the fireplace there?"

Frequent Commands. In one embodiment, if a user frequently asks for a specific command or set of commands, the system may recommend those commands when appropriate. For example, a user might frequently issue the compound command, "turn on the lights, open the shades, and play classical music." If such a command is given frequently, the system can recommend to run that set of commands as a form of a "macro" and/or a micro-scene.

In one embodiment, if a user consistently responds positively to a recommendation with some correlation to time and/or location, the system internalizes the consistency. This may include making a meta-recommendation "Each time I recommend you turn on the fireplace in winter when you come home you say Yes; may I just automatically do that in the future?" or simply executing the recommendation without checking.

Health and Wellness. In one embodiment, the home system makes recommendations that encourage healthy living and enhanced wellness. For example, if the system knows the user has to be awake at 6 am and they are watching TV after midnight, it may recommend turning off the TV. The system may make alerts regarding indoor air quality, unhealthy water, and the state of various sensors that contribute to the conditions in the home. For example, the system may say "I've detected large amounts of CO in the air, consider opening a window and checking for gas leaks."

In one embodiment, health and wellness comprises at least four important aspects of lighting, indoor air quality, water quality, and sleep. For lighting, a recommendation may include to reduced cooler or bluer lighting in the evening to synchronize with circadian rhythm. For indoor air quality, a recommendation may be to check filters and/or gas leaks. For water, a recommendation may be to check a water filter. A recommendation may also be related to a urine/stool analysis, for example "As a diabetic, your urine ketone levels are a little off, may I recommend you take a look at your diet?" For sleep, a recommendation may be made in conjunction with a fitness tracker to improve sleep, for example "Around 3:30 am when United Flight 888 flies over your home you seem to leave REM sleep cycles; would you like me to play white noise when I track that flight and other flights coming close to the home?"

In one embodiment, the home system makes recommendations on home health and/or subsystem health such as end-of-life or reduced efficiency in subsystems. For example, over time HVAC filters clog and reduce the efficiency of an HVAC subsystem. In the event the system monitors the reduced efficiency of cooling a home while correlating outdoor light, heat, and time, a recommendation may be to check the HVAC filters: "The air conditioner normally drops temperature by 2 degrees per hour when the patio is 85 F like it is today but it's only dropping temperature by 1 degree per hour; could you please check the filters?"

In one embodiment, the home system makes recommendations on subsystem health when it notices intradomain issues. For example, an HVAC whole-house humidifier requires water from the mains, and gas to heat the water to steam for injection into the HVAC. In the event the system monitors reduced whole-house humidity effectiveness along with normal water usage for sprinklers, but also reduced water heater effectiveness, the system may recommend investigation of the gas line: "The gas line isn't working well for the humidifier and water heater; I recommend calling the gas company for a possible leak."

Utility Announcements. In one embodiment, the system may monitor for leak detection in pipes, spikes in energy usage, and the possibility that certain applications stop working as expected such as a faulty washing machine or refrigerator. When detected the system may send an announcement, such as, "Warning, a leak has been detected in the basement. I've shut off the valve. Please inspect at your earliest convenience."

For example, in an area with low lying water with unseasonal rain and/or groundwater, a recommendation for a premises with a sump pump may be to check sump pump functionality and/or turn on a sump pump. For example, if sprinklers are activated but no/reduced whole-house water flow is detected, a recommendation to check the sprinklers for damage may be made.

Functionality.

Device State Actions. In one embodiment, the system maintains state for every connected device in the home and tracks its state over time. Device and/or subsystem classes include, but are not limited to: lighting, binary lighting, dimmable lighting, color temperature adjustable lighting, full color RGB lighting, Christmas lighting; shades; HVAC; television; streaming devices television; cable television; satellite television; input switching for television; television volume; music; music artists; music songs, music albums; music genres; new music recommendation; locks; garage doors; fountains; coffee makers; coffee maker drink recipes; smart refrigerator; smart dishwasher; smart oven; smart microwave; fans; fireplaces; instahot; smart plugs; smart plug devices; sprinklers; air quality sensors; motion sensors; occupancy sensors; leak detection sensors; temperature sensors; door open sensors; fitness products; health care monitoring subsystems; calendar integration; smart cars; smart electric vehicles; projectors; amplifiers; cameras; facial recognition subsystems; optical character recognition subsystems; pan/tilt/zoom cameras; security systems; spas; pool heaters; doorbells; doors; alarms; sensors; windows; gates; intercoms; audio equipment; and/or video equipment.

In one embodiment, each device has state specific to its capabilities. Device state may be stored on transition and is retained with relevant metadata including timestamp/datestamp, and identifier for a user and/or associates that modified the device and/or is associated with the device, the location of the user and/or associates, and method of control when state changed from one of the system's control interfaces, including voice, touch control, via app, and/or via browser.

In one embodiment, a device may be in at least one of the following: an open state; an closed state; an on state; an off state; an activated state; an extent of being on (e.g. on for 3.23 hours); an extent of being open; and an extent of being activated (e.g. activated for 2.12 minutes). In one embodiment, a device state may include at least one of the following: a parameter controlled by the premises automation solution (e.g. an HVAC set to a cooling or heating mode); a parameter controllable by the premises automation solution (e.g. an HVAC setpoint for a desired temperature); and a parameter monitored by the premises automation solution (e.g. an HVAC probe temperature for the current temperature).

In one embodiment, the identify of a current user is identified by at least one of the following: a phone, an app, and a voice. One simple recommendation is alerting a user what state a device is currently in and providing the option to invert that state. Use cases include locks being unlocked, gates or garage doors left open, and lights being left on.

Sensor State Actions. Modern premises commonly have sensors that the system may leverage. Sensor classes include, but are not limited to: alarm, open/close, occupancy, motion, person detection, biometric, mailbox shake, pet door, environmental, physical, quality, and/or acoustic. Sensor state may be considered a special case of a device state, implying physical presence and is typically tied to a specific area within the home. This sensor state may be used to infer that a user is present. When presence of a user is known to a particular room, real time recommendations for devices in that room are possible. For example, when a user enters the garage from the outside, the system may recommend running the "I'm home" scene.

In one embodiment, a sensor may be in at least one of the following: an open state; an closed state; an on state; an off state; an activated state; an extent of being on (e.g. on for 2.12 hours); an extent of being open; and an extent of being activated (e.g. activated for 3.52 minutes). In one embodiment, a sensor may be a sensor integration of a plurality of sensors, for example a thermal HVAC sensor integrated with an alarm-system motion sensor to reduce false positive readings of humans set off by housepets.

Machine Learning and Pattern Recognition. In one embodiment, the system uses various forms of machine learning techniques, combined with the device state, sensor history, and user history to recognize patterns and make recommendations. In one embodiment, the system detects anomalies in order to ascertain something is unusual and could use attention and/or escalate severity, like a garage door being open in the middle of the day or a thermostat running at 50° F. for more than an hour.

User Data. Preferences. In one embodiment, each recommendation is in the context of a particular user, as opposed to generic recommendations for the entire home. When a recommendation is presented to the user, they are given the option to accept it or ignore it. The system stores the user's responses to past recommendations and uses that history to refine the types of recommendations the user is presented with. If a user has frequently ignored recommendations to play curated music, it is inferred that the user is not interested in music recommendations, and it is not likely for the user to be presented with music recommendations in the future. In one embodiment, a survey or other technique is used to explicitly probe a user for preferences to be associated with the user.

Permissions. In one embodiment, each user has permissions defined within the system. These permissions may grant the user access to a subset of the devices or rooms within the home. Recommendations are tailored to the devices and rooms that the user has permission to access. For example, children may have a subset of permissions that parents may have. Permissions may also be associated with rooms, for example, a user in the master bathroom may have permission to unlock a locked door to the master bedroom, but a user in the master bedroom may not have permission to unlock the locked door to the master bathroom.

Location. In one embodiment, timestamped location data is available to the system via GPS position from mobile devices. This location data implies whether a user is home or away. Location data may also be determined by where the user was in the home when they gave a command. This location and/or room they were in may be determined by the location of the microphones that heard the users command.

Media Suggestions. Music. In one embodiment, the system makes music recommendations based on the specific user, the location of the user, the time of day, and the history of what they have listened to in the past. The system has knowledge of music requests made for music artists, genres, playlists, radio stations, albums, and songs. This data, combined with the systems knowledge of this user and other users will form recommendations that the user may like.

Video. In one embodiment, the system makes video recommendations based on the specific user, the location of the user, the time of day, and the history of what they have watched in the past. The system has knowledge of video requests made for TV shows, movies, actors, sports, documentaries, news and other content. The system also understands what platforms the user prefers based on their selections for live tv content, cable, satellite, and/or streaming services.

The system also has knowledge of the specific cable/satellite channels that were watched, at a specific time on a specific day, and the system may infer that there is some content on that channel they are interested in. If the user is at home at a specific time, the system may suggest to tune to such a channel. If they are away, the system may suggest to DVR and/or record the content.

Converting Actions into Natural Language Suggestions. In one embodiment, the system uses contextual information to convert the desired action into a human readable recommendation. The system factors in the currently active user and any current device state, sensor state or conditions to make a suggestion.

For instance, if the action to suggest is 'Door Lock' the system will construct a recommendation, "Hello Kevin, Just a reminder that your front door is unlocked. You usually lock it around 10 PM and it's almost that time. May we lock it now?"

Initial recommendations. Because the initial amount of data in a home may be quite small, the system has default hypotheses and/or static recommendations that it attempts to fit to user actions. For example, the system may have hypotheses like:

Garage doors should be closed if no one is home.
Workout music should be played in the gym when it is occupied.
Lights in certain rooms or on certain floor should be turned off. The system can often predict this based on the names of the rooms or the time of day.

Initial hypotheses are modified over time so they are more in line with the past behavior of the user.

In one embodiment, because the amount of data is so limited, past actions are put into bins by time of day, day of the week and location. An example of time bins may be the 5 pm bin (from 5:00 pm to 5:59 pm), the 4 pm-6 pm bin (from 4:00 pm to 6:59 pm), and the 3 pm-7 pm bin (from 3:00 pm to 7:59 pm). When searching for a recommendation the system looks at what actions were performed at a similar time or in a similar place to determine what to do. User actions that are close in time and/or place are the basis from which hypotheses and recommendations are formed.

Scoring. In one embodiment, responses to recommendations are stored along with historical context including timestamp/datestamp, device, sensor, user identity, environment, and/or location at least in part to establish a scoring system. By weighting a score matching a current context to the historical context, the system presents a scoring and/or ranking to possible recommendations. For example, there may be fifty possible recommendations with the large number of devices in a particular house, so the scoring system filters based on the current context to provide a few of the fifty possible recommendations to present in order.

In one embodiment, a user configuration also adjusts a score or rank. That is, a user may opt-in and/or opt-out of recommendations and/or recommendation types, for example a user may opt-in to all lighting recommendations, but opt-out of music recommendation because they have an external and/or commercial source for music recommendations.

Figure 5:
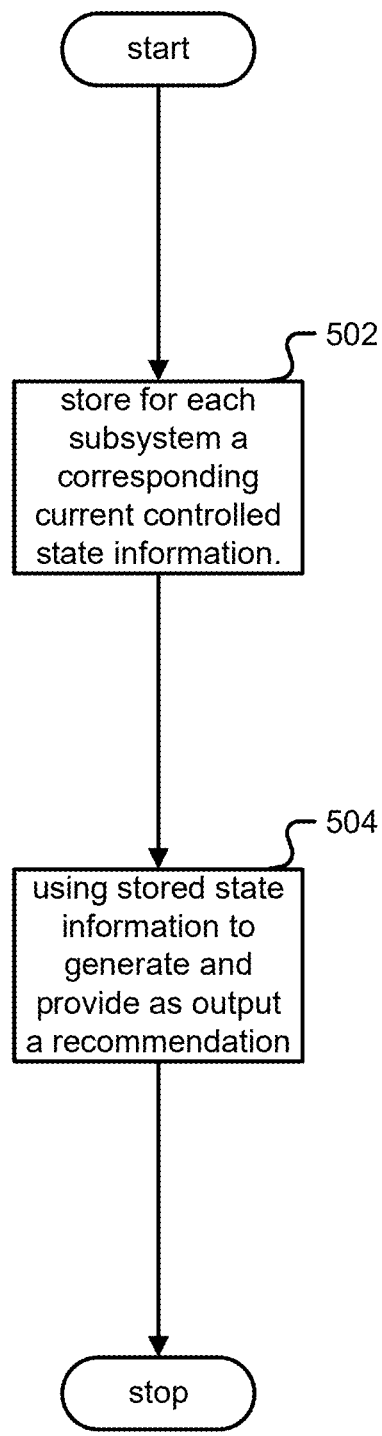
FIG. 5 is a flow diagram illustrating an embodiment of a process for premises automation recommendation.

FIG. 5 is a flow diagram illustrating an embodiment of a process for premises automation recommendation. In one embodiment, the process of FIG. 5 is carried out by the premises automation device (204) in FIG. 2.

In step (502), for each of a plurality of subsystems comprising a premises automation solution a corresponding current controlled state information is stored. In one embodiment, the corresponding current controlled state information is at least one of the following: an open state; an closed state; an on state; an off state; an activated state; an extent of being on; an extent of being open; and an extent of being activated.

In one embodiment, the corresponding current controlled state information is at least one of the following: a parameter controlled by the premises automation solution; a parameter controllable by the premises automation solution; and a parameter monitored by the premises automation solution. In one embodiment, the corresponding current controlled state information is associated with a premises automation scene.

In step (504), stored state information associated with the plurality of subsystems is used to generate and provide as output a recommendation to perform a recommended operation with respect to one or more of said subsystems. In one embodiment, the recommendation comprises changing to a suggested premises automation scene. In one embodiment, the recommendation comprises creating and storing a new premises automation scene based on the corresponding current controlled state information. In one embodiment, generating the recommendation is based at least in part on a current user's past behavior.

In one embodiment, generating the recommendation is based at least in part on a current user's past behavior under a similar condition to the current controlled state information. In one embodiment, generating the recommendation is based at least in part on a similar user's past behavior under a similar condition to the current controlled state information, wherein the similar user is similar to a current user.

In one embodiment, generating the recommendation is based at least in part on a current user's past behavior in whether the current user accepted a similar recommendation previously. In one embodiment, generating the recommendation is specific to a current user regardless of a similar condition to the current controlled state information. In one embodiment, generating the recommendation is specific to a current user, and the current user is identified by at least one of the following: a phone, an app, and a voice.

In one embodiment, providing the recommendation is via at least one of the following: by phone; and by voice. In one embodiment, generating the recommendation comprises determining a set of possible recommendations and scoring the set of possible recommendations.

In a step (not shown in FIG. 5) user actions are tracked and segregated into time bins, wherein generating the recommendation is based at least in part on the time bins. Similarly current controlled state information may be tracked and segregated into time bins, and wherein generating the recommendation is based at least in part on these time bins. In a step (not shown in FIG. 5) anomalies are detected, wherein generating the recommendation includes responding to the anomaly.

In one embodiment, corresponding current controlled state information is based at least in part on sensor integration, event triggers, and geo-fencing. In one embodiment, the corresponding current controlled state information is based at least in part on a current user location, including whether a current user is on premises or away.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a user display;
a memory or other hardware storage device configured to store for each of a plurality of subsystems comprising a premises automation solution a corresponding current controlled state information; and
a processor coupled to the user display and the memory or other hardware storage device and configured to:
  select and provide as output an initial recommendation in an event that a set of historical context user actions is empty;
  track a historical context user action, at least in part by segregating the historical context user action into a set of bins based at least in part on a historical time for a historical user action and a historical location for the historical user action;
  wherein each bin in the set of bins is bucketed by time of day, day of week, and location;
  wherein each time of day bucket in the set of bins includes a start time of day and an end time of day based at least in part on how limited historical time of day data is;
  wherein each day of week bucket in the set of bins includes a start day of week and an end day of week based at least in part on how limited historical day of week data is;
  wherein each location bucket in the set of bins includes a geolocation range considered to be a close location for the location bucket;
  wherein the historical context user action comprises a historical weather condition during the historical user action;
  record the historical context user action in the memory or other hardware storage device;
  track a current context, at least in part by segregating the corresponding current controlled state information in the set of bins;
  wherein the current context comprises a current weather condition;
  match the current context to the set of historical context user actions, wherein the matching is based at least in part on a weighted score based at least in part on what actions were performed at a same time of day bucket, a same day of week bucket, the close location using the set of bins, and a similar current weather condition to the historical weather condition;
  modify the initial recommendation based at least in part on the set of historical context user actions;
  generate a current recommendation statement for a given user associated with a user identifier to perform a recommended operation with respect to one or more of said subsystems of the premises automation solution, based at least in part on the matching;
  render as output to the user display: the current recommendation statement; and an UI (user interface) element for a current recommendation response, wherein the UI element includes at least one of the following: a voice toggle button, a voice control button, a simplified direct control view, a button, a follow-up response option, an ellipsis, a slider, and a dialog;

receive as input associated with the rendered UI elements for the current recommendation response a user input associated with the current recommendation; and provide a command to a control output device configured to control a connected device in a home, wherein the control output device is at least one of the following: a smart home hub, a smart home device with direct control, and a sensor.

2. The system of claim 1, wherein the corresponding current controlled state information is at least one of the following: an open state; a closed state; an on state; an off state; an activated state; an extent of being on; an extent of being open; and an extent of being activated.

3. The system of claim 1, wherein the corresponding current controlled state information is at least one of the following: a parameter controlled by the premises automation solution; a parameter controllable by the premises automation solution; and a parameter monitored by the premises automation solution.

4. The system of claim 1, wherein the corresponding current controlled state information is associated with a premises automation scene.

5. The system of claim 1, wherein the recommendation comprises changing to a suggested premises automation scene.

6. The system of claim 1, wherein the recommendation comprises creating and storing a new premises automation scene based on the corresponding current controlled state information.

7. The system of claim 1, wherein generating the recommendation is based at least in part on a current user's past behavior.

8. The system of claim 7, wherein generating the recommendation is based at least in part on a current user's past behavior under a similar condition to the current controlled state information.

9. The system of claim 8, wherein generating the recommendation comprises adjusting a score based at least in part on a similar user's past behavior under a similar condition to the current controlled state information, wherein the similar user is similar to a current user.

10. The system of claim 9, wherein generating the recommendation is based at least in part on a current user's past behavior in whether the current user accepted a similar recommendation previously.

11. The system of claim 10, wherein the recommendation response comprises a follow-up response to select particular connected devices.

12. The system of claim 11, wherein the follow-up response comprises options to follow the recommendation to a specified extent using an other UI (user interface) element, wherein the other UI element includes at least one of the following: a voice toggle button, a voice control button, a simplified direct control view, a button, a follow-up response option, an ellipsis, a slider, and a dialog.

13. The system of claim 12, wherein generating the current recommendation statement is based at least in part on machine learning to detect anomalies.

14. The system of claim 13, wherein generating the current recommendation statement comprises detecting anomalies that involve a security alarm.

15. The system of claim 14, wherein generating the current recommendation statement comprises assessing a severity level with an associated persistence.

16. The system of claim 15, wherein the severity level comprises a call to a security authority.

17. The system of claim 16, wherein generating the recommendation based at least in part on the current user's past behavior comprises using collaborative filtering to eliminate a recommendation offering with respect to one or more of said subsystems of the premises automation solution.

18. The system of claim 17, wherein generating the recommendation based at least in part on the current user's past behavior comprises using collaborative filtering to increase recommendation offerings with respect to one or more of said subsystems of the premises automation solution.

19. The system of claim 18, wherein generating the current recommendation statement comprises generating a recommendation for a product replacement for a given subsystem in an event the sensor indicates the given subsystem is failing.

20. The system of claim 1, wherein generating the recommendation is specific to a current user regardless of a similar condition to the current controlled state information.

21. The system of claim 1, wherein generating the recommendation comprises adjusting a score specific to a current user, and the current user is identified by at least one of the following: a phone, an app, and a voice.

22. The system of claim 1, wherein providing the recommendation is via at least one of the following: by phone; and by voice.

23. The system of claim 1, wherein generating the recommendation comprises determining a set of possible recommendations and scoring the set of possible recommendations.

24. The system of claim 1, wherein the processor is further configured to track user actions and segregate tracked actions into time bins, and wherein generating the recommendation is based at least in part on the time bins.

25. The system of claim 1, wherein the processor is further configured to track current controlled state information and segregate tracked information into time bins, and wherein generating the recommendation is based at least in part on the time bins.

26. The system of claim 1, wherein the plurality of subsystems comprises at least one of the following subsystems: lighting; shades; HVAC; television; music; locks; garage doors; fans; fireplaces; sprinklers; security systems; doorbells; and intercoms.

27. The system of claim 1, wherein the corresponding current controlled state information is based at least in part on sensor integration, event triggers, and geo-fencing.

28. The system of claim 1, wherein the corresponding current controlled state information is based at least in part on a current user location, including whether a current user is on premises or away.

29. The system of claim 1, wherein the processor is further configured for detecting an anomaly, wherein generating the recommendation includes responding to the anomaly.

30. The system of claim 1, wherein the connected device comprises at least one of the following: lighting; shades; HVAC; television; music; locks; garage doors; fans; fireplaces; sprinklers; security systems; doorbells; and intercoms.

31. A method, comprising:
storing for each of a plurality of subsystems comprising a premises automation solution a corresponding current controlled state information;
selecting and providing as output an initial recommendation in an event that a set of historical context user actions is empty;
tracking a historical context user action, at least in part by segregating the historical context user action into a set of bins based at least in part on a historical time for a historical user action and a historical location for the historical user action;
wherein each bin in the set of bins is bucketed by time of day, day of week, and location;
wherein each time of day bucket in the set of bins includes a start time of day and an end time of day based at least in part on how limited historical time of day data is;
wherein each day of week bucket in the set of bins includes a start day of week and an end day of week based at least in part on how limited historical day of week data is;
wherein each location bucket in the set of bins includes a geolocation range considered to be a close location for the location bucket;
wherein the historical context user action comprises a historical weather condition during the historical user action;
recording the historical context user action;
tracking a current context, at least in part by segregating the corresponding current controlled state information in the set of bins;
wherein the current context comprises a current weather condition;
matching the current context to the set of historical context user actions, wherein the matching is based at least in part on a weighted score based at least in part on what actions were performed at a same time of day bucket, a same day of week bucket, the close location using the set of bins, and a similar current weather condition to the historical weather condition;
modifying the initial recommendation based at least in part on the set of historical context user actions;
generating a current recommendation statement for a given user associated with a user identifier to perform a recommended operation with respect to one or more of said subsystems of the premises automation solution, based at least in part on the matching;
rendering as output to a user display: the current recommendation statement; and an UI (user interface) element for a current recommendation response, wherein the UI element includes at least one of the following: a voice toggle button, a voice control button, a simplified direct control view, a button, a follow-up response option, an ellipsis, a slider, and a dialog;
receiving as input associated with the rendered UI elements for the current recommendation response a user input associated with the current recommendation; and
providing a command to a control output device configured to control a connected device in a home, wherein the control output device is at least one of the following: a smart home hub, a smart home device with direct control, and a sensor.

32. A computer program product embodied in a non-transitory computer readable medium and comprising computer instructions for:
storing for each of a plurality of subsystems comprising a premises automation solution a corresponding current controlled state information;
selecting and providing as output an initial recommendation in an event that a set of historical context user actions is empty;
tracking a historical context user action, at least in part by segregating the historical context user action into a set of bins based at least in part on a historical time for a historical user action and a historical location for the historical user action;
wherein each bin in the set of bins is bucketed by time of day, day of week, and location;
wherein each time of day bucket in the set of bins includes a start time of day and an end time of day based at least in part on how limited historical time of day data is;
wherein each day of week bucket in the set of bins includes a start day of week and an end day of week based at least in part on how limited historical day of week data is;
wherein each location bucket in the set of bins includes a geolocation range considered to be a close location for the location bucket;
wherein the historical context user action comprises a historical weather condition during the historical user action;
recording the historical context user action;
tracking a current context, at least in part by segregating the corresponding current controlled state information in the set of bins;
wherein the current context comprises a current weather condition;
matching the current context to the set of historical context user actions, wherein the matching is based at least in part on a weighted score based at least in part on what actions were performed at a same time of day bucket, a same day of week bucket, the close location using the set of bins, and a similar current weather condition to the historical weather condition;
modifying the initial recommendation based at least in part on the set of historical context user actions;
generating a current recommendation statement for a given user associated with a user identifier to perform a recommended operation with respect to one or more of said subsystems of the premises automation solution, based at least in part on the matching;
rendering as output to a user display: the current recommendation statement; and an UI (user interface) element for a current recommendation response, wherein the UI element includes at least one of the following: a voice toggle button, a voice control button, a simplified direct control view, a button, a follow-up response option, an ellipsis, a slider, and a dialog;
receiving as input associated with the rendered UI elements for the current recommendation response a user input associated with the current recommendation; and
providing a command to a control output device configured to control a connected device in a home, wherein the control output device is at least one of the following: a smart home hub, a smart home device with direct control, and a sensor.

* * * * *